April 21, 1964    C. K. BESWICK ETAL    3,130,311
RADIOACTIVE SELECTOR CIRCUIT FOR CONTROLLING THE LEVEL
OF MATERIAL BETWEEN A SOURCE AND SELECTOR
Filed Aug. 27, 1959
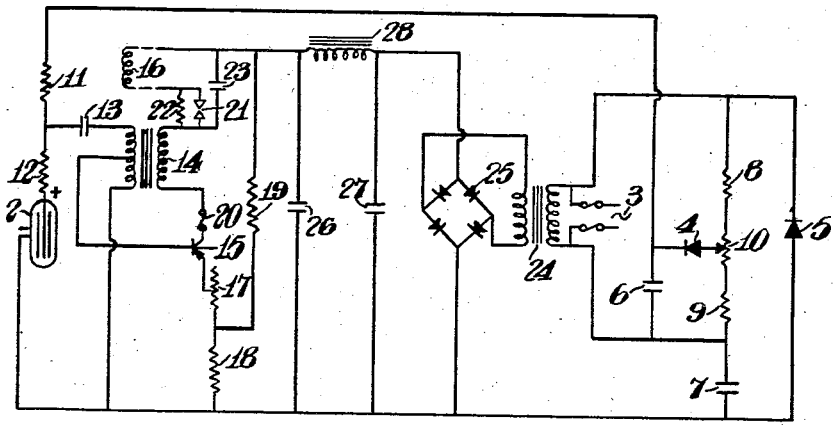
Inventors
C. K. Beswick
G. W. Whitehurst 3,130,311
RADIOACTIVE SELECTOR CIRCUIT FOR CONTROLLING THE LEVEL OF MATERIAL BETWEEN A SOURCE AND SELECTOR
Clifford Kenneth Beswick, Heaton Moor, Stockport, and Gordon William Whitehurst, Bollington, near Macclesfield, England, assignors to Simon-Carves Limited, Cheshire, England, a company of Great Britain
Filed Aug. 27, 1959, Ser. No. 836,395
Claims priority, application Great Britain Sept. 15, 1958
8 Claims. (Cl. 250—83.6)

This invention relates to indicating or controlling devices, for example for initiating or controlling the operation of processes or apparatus in dependence upon the presence or absence of an object or material.

It is known, for such purposes, to use a radiation detector in conjunction with a radiation source in such manner that the radiation reaching the detector is interrupted by the object or material to operate a control or an indicator.

An object of the present invention is to provide an improved indicating or controlling device of high sensitivity and simple construction.

According to the invention an indicating or controlling device comprises a radiation sensitive device, such as a Geiger-Müller tube, for providing impulses according to the count of radiation falling thereon from a radio-active source, a blocking oscillator-type circuit adapted to be triggered by said impulses, and means for energising an indicator or control circuit in accordance with the current flow in the output of the oscillator.

A preferred circuit for operating the device from a 240 volt A.C. mains supply is shown in the accompanying drawing. It will be clear to those skilled in the electrical arts, however, that the device can readily be adapted to operate on other A.C. voltages or from suitable D.C. batteries.

As shown in the drawing, the radiation detector 2 comprises a halogen-quenched Geiger-Müller tube having a threshold voltage of 370 volts at 20° C., the plateau length at this temperature being 90 volts. An electric high tension supply of 415 volts is required to enable the tube 2 to be operated at the centre of the plateau and this is conveniently obtained from a normal 240 volt A.C. mains supply 3 by means of a known type of voltage doubler comprising rectifiers 4 and 5 and condensers 6 and 7. The output is variable by means of a potential divider comprising fixed resistances 8 and 9 and a variable resistance 10.

The electric high tension from the voltage doubler is applied to the tube 2 through high value resistances 11 and 12.

Small current pulses produced by the tube 2 in response to radiation from a radioactive source develop low voltage pulses in resistances 11 and 12, and these pulses are taken from the junction of these resistors, through a condenser 13, to a series loaded monostable blocking oscillator circuit.

The pulses from the tube 2 are of random shape and amplitude, and the blocking oscillator circuit is adapted to be triggered by any pulse to produce an output pulse of uniform shape and amplitude.

A transformer 14 in the blocking oscillator circuit combines the functions of timing and of providing the necessary loop current gain.

The transistor 15 is a p.n.p. low power, low frequency type with an average current gain of 60 and is connected in common emitter configuration. Its base current is supplied through the primary winding of transformer 14 and its collector current is limited, inter alia, by the resistance of the coil of a relay 16.

Resistances 17, 18 and 19 form a biassing and stabilising network. The resistance 17 is variable, enabling the standing bias conditions to be varied, and thus forms a sensitivity control. The transistor is not completely saturated, the low value resistance 18 preventing complete saturation when the resistance 17 is at zero resistance. A fuse 20 is incorporated in the collector circuit to prevent damage of the transistor 15 due to overloads.

The load is mainly inductive and comprises the coil of relay 16, which relay has two independent sets of change-over contacts operated simultaneously by current in the relay coil. Each of these sets of change-over contacts comprises one normally-open pair and one normally-closed pair which operate together, i.e., as one normally-open pair closes, the associated normally-closed pair opens.

Of these change-over contacts, one set is connected, as required, into the circuit to be controlled, such as, for instance, for the operation of a signal (either visible or audible), an electric motor, a solenoid or like switch, or such other application as may be desired. Depending upon the nature of control required either the normally-open or the normally-closed contacts are connected into the control circuit.

Of the remaining set of change-over contacts the normally-open contacts, shown as contacts 21, are those used in the transistor circuit, the associated normally-closed contacts not being used.

The normally-open contacts of the relay pull in at a current of 10 milliamps. and drop out at about one-third of this current.

When the average value of the output current pulses, which pulses are smoothed or integrated to a certain extent by condenser 23, reach this operating relay current, the contacts 21 close to short-out a resistor 22, which is in series with the coil of relay 16 and has a value of one-tenth of the coil resistance. This shorting-out gives a ten percent increase in the current through the relay coil and thus prevents relay chatter due to fluctuations in the pulse rate.

With the closing of the contacts 21 the associated contacts (not shown) in the control circuit are similarly closed and opened, respectively, and the control circuit is thus energised or de-energised as the case may be.

The low voltage power supply for the transistor 15 is obtained from the secondary of the mains transformer 24, through a bridge rectifier 25, and is smoothed by the condensers 26, 27 and choke 28.

The device may be used for detecting operating conditions in many diverse applications such as the presence or absence of materials between the tube 2 and a suitable source of radioactivity such as, for instance, a collimated beam of gamma or like rays.

Without limitation in this regard, its application is described hereunder in the maintenance of the level of fluent materials in a container. This may be in checking the level of either a discrete material in a carton, package or the like, or of a liquid in a bottle, tank or other vessel and in either case can be adapted to control the filling or replenishment of such a container within narrow limits, or alternatively, to discard containers not filled to a minimum level by automatic filling and/or weighing apparatus. In whichever particular way the device is used, in this regard, its actual operation will be the same.

In the operation of the device for the above purpose, a suitable radioactive source, which may conveniently be a radioactive isotope, is secured to, or in the path of, a container so that the collimated beam of rays emitted therefrom lies at the desired level of the material in the container, and a device of the present invention is disposed on the opposite side of the container, or of its path, so that the collimated beam falls on the tube 2. The level of the beam may be such that when the container is filled to the desired level the beam passes through the upper level of the material and is reduced in intensity thereby. Thus, if the level of material falls below the desired level, i.e., below the level of the beam, the beam falls with increased intensity on the tube 2, increasing the pulse rate therein and, as previously described herein, simultaneously closing the normally-open contacts 21 and the associated normally-open contacts in the other change-over set of the relay 16. (It should here be noted that although it is preferred to include the contacts 21 and resistor 22 in the relay circuit to prevent relay chatter, they are not essential to the actual operation of the device, which will, in fact, function if the coil of the relay 16 is connected directly to the transformer 14. In such an event, however, relay chatter may occur as the result of pulse fluctuations, and for this reason the inclusion of the contacts 21 and resistor 22 is to be preferred.)

The normally-open contacts in the control circuit remain closed so long as the pulse rate in the tube 2 remains high, i.e., so long as the beam remains uninterrupted, and these contacts are connected into a suitable control circuit which is used to operate the required control or indicating mechanism, which may be valve means to admit material to the container, an audible or visual signal, means to discard the container from a moving conveyor, or any other desired control or indicating mechanism.

Immediately the beam is again interrupted, the pulse rate in the tube 2 is decreased and the contacts 21 and associated contacts in the control circuit open to de-energise the control circuit until the intensity of the beam again increases.

The device can similarly be used to detect the level of the interface between fluent materials of different densities and will operate in precisely the same manner except that the actuation of the relay 16 will be effected by smaller differences in intensity of the beam.

It is also operable to control minimum and maximum levels of material where the range is greater than in the example described hereabove, and in such a case one source and device will require to be used at each of the levels.

It is preferred to use a suitable transistor 15 in the circuit instead of a more-conventional thermionic valve, as the life of a transistor is long and it is not so liable to damage by vibration. The circuit also operates on an extremely low count rate.

The device is rugged in construction and will withstand a great deal of mishandling and vibration without harmful damage.

What we claim is:

1. An electrically controlled system which comprises an electric sensing circuit comprising in series a pair of resistances, a radiation-sensitive device and a source of continuous, direct-current high electric tension, a blocking oscillator circuit connected into said sensing circuit in parallel with one of said resistances and said radiation-sensitive device and comprising in series a condenser, and a transformer primary in series, and a control circuit comprising a load relay coil, a secondary of said transformer and an electronic control device having a control element connected to and actuated by the primary of said transformer.

2. The device of claim 1 in which said electronic control device is a transistor having a base connected to the primary of said transformer.

3. The device of claim 2 in which said transistor is a PNP resistor.

4. The system of claim 3 in which the $n$ region is connected to an intermediate point of the primary of the transformer.

5. The system of claim 1 in which said transformer primary is connected to said sensing circuit at the junction of said pair of resistances.

6. The system of claim 5 having a variable resistance in series with said transistor.

7. The device of claim 1 in which said control circuit has a resistance element in series with said load relay coil and an electro-magnetic relay closed by the energization of said relay to short-circuit said resistance element.

8. A device as claimed in claim 7 wherein the resistance of said resistance element is approximately ten percent of the D.C. resistance of the load relay coil.

References Cited in the file of this patent

UNITED STATES PATENTS

| | | |
|---|---|---|
| 2,323,128 | Hare | June 29, 1943 |
| 2,596,500 | Molloy | May 13, 1952 |
| 2,596,956 | Nierman | May 13, 1952 |
| 2,612,743 | Strother | Oct. 7, 1952 |
| 2,617,043 | Hepp | Nov. 4, 1952 |
| 2,866,100 | Leaver | Dec. 23, 1958 |

FOREIGN PATENTS

| | | |
|---|---|---|
| 699,129 | Great Britain | Oct. 28, 1953 |